(12) United States Patent
Fujii et al.

(10) Patent No.: US 11,736,929 B2
(45) Date of Patent: Aug. 22, 2023

(54) VEHICLE SYSTEM, IN-VEHICLE DEVICE, AND TERMINAL LOCATING METHOD

(71) Applicant: DENSO CORPORATION, Kariya (JP)

(72) Inventors: Ryozou Fujii, Kariya (JP); Nobuyasu Okabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/749,283

(22) Filed: May 20, 2022

(65) Prior Publication Data

US 2022/0279335 A1 Sep. 1, 2022

Related U.S. Application Data

(63) Continuation of application No. PCT/JP2020/036780, filed on Sep. 29, 2020.

(30) Foreign Application Priority Data

Nov. 25, 2019 (JP) .................. 2019-212545

(51) Int. Cl.
*H04B 7/00* (2006.01)
*H04W 8/00* (2009.01)
*H04W 4/48* (2018.01)
*H04W 4/80* (2018.01)
*H04B 1/713* (2011.01)

(52) U.S. Cl.
CPC ............ *H04W 8/005* (2013.01); *H04B 1/713* (2013.01); *H04W 4/48* (2018.02); *H04W 4/80* (2018.02)

(58) Field of Classification Search
CPC ......... H04W 8/005; H04W 4/48; H04W 4/80; H04B 1/713

USPC ......................................................... 455/101
See application file for complete search history.

(56) References Cited

U.S. PATENT DOCUMENTS

| | | | | |
|---|---|---|---|---|
| 9,767,629 | B1 * | 9/2017 | Gulati | G07C 9/20 |
| 9,913,096 | B1 * | 3/2018 | Chen | H04W 4/025 |
| 11,027,701 | B2 * | 6/2021 | Sanji | G01S 11/06 |
| 11,202,302 | B2 * | 12/2021 | Cross | G08G 1/096716 |
| 11,456,835 | B2 * | 9/2022 | Muruganathan | H04L 5/005 |

(Continued)

FOREIGN PATENT DOCUMENTS

JP 2019158765 A 9/2019

*Primary Examiner* — April G Gonzales
(74) *Attorney, Agent, or Firm* — Harness, Dickey & Pierce, P.L.C.

(57) ABSTRACT

A vehicle system includes a portable terminal and an in-vehicle device. The portable terminal is configured to perform short-range wireless communication. The in-vehicle device is configured to locate the portable terminal based on a reception strength. The portable terminal includes a transmission unit configured to change a channel among channels. A reception strength selection unit of the in-vehicle device is configured to select a particular number of reception strengths for consecutive ones of the channels. A terminal locator unit of the in-vehicle device is configured to prioritize a largest reception strength to locate the portable terminal based on the reception strength. An upper limit of the particular number is set to be higher as an interval for transmitting information from the antenna to the in-vehicle device is shorter, and a lower limit of the particular number is set based on a multipath reduction effect.

6 Claims, 5 Drawing Sheets

(56) References Cited

U.S. PATENT DOCUMENTS

| | | | |
|---|---|---|---|
| 2005/0037825 A1* | 2/2005 | Faranda | H01Q 1/526 |
| | | | 455/345 |
| 2010/0234071 A1* | 9/2010 | Shabtay | H04B 7/155 |
| | | | 455/562.1 |
| 2012/0044072 A1* | 2/2012 | Pandey | G08B 21/0247 |
| | | | 340/539.21 |
| 2013/0283351 A1* | 10/2013 | Palin | G06F 21/6218 |
| | | | 726/4 |
| 2016/0088422 A1* | 3/2016 | Foster | H04W 4/20 |
| | | | 455/41.2 |
| 2020/0233072 A1 | 7/2020 | Osai et al. | |
| 2020/0269809 A1* | 8/2020 | Sanji | B60R 25/31 |
| 2022/0104053 A1* | 3/2022 | Ye | H04W 24/10 |

\* cited by examiner

| | PREDETERMINED NUMBER | | |
|---|---|---|---|
| | SMALL | INTERMEDIATE | LARGE |
| GREATEST VALUE | 14 | 8 | 8 |
| AVERAGE VALUE | 22 | 23 | 23 |

VEHICLE SYSTEM, IN-VEHICLE DEVICE, AND TERMINAL LOCATING METHOD

CROSS REFERENCE TO RELATED APPLICATION

The present application is a continuation application of International Patent Application No. PCT/JP2020/036780 filed on Sep. 29, 2020, which designated the U.S. and claims the benefit of priority from Japanese Patent Application No. 2019-212545 filed on Nov. 25, 2019. The entire disclosures of all of the above applications are incorporated herein by reference.

TECHNICAL FIELD

The present disclosure relates to a vehicle system configured to locate a portable terminal, an in-vehicle device, and a method of locating the portable terminal.

BACKGROUND

There is a technology that uses radio waves transmitted and received between an in-vehicle device and a portable terminal to discover the position of the portable terminal. For example, based on reception strength of signals transmitted from the portable terminal and received by an antenna provided in a vehicle, using communication conforming to short-distance wireless communication standards such as Bluetooth (registered trademark) Low Energy, it is determined whether the portable terminal is inside the passenger compartment. Further, according to the Bluetooth standards, encrypted data communication may be performed by frequency hopping method in which the channel used for the communication is periodically switched. Further, for example, the average value of the recent N reception strengths on the channel set for reception is used as the representative value, or the latest reception strength is used as the representative value.

SUMMARY

According to a first aspect, a vehicle system includes a portable terminal configured to perform short-range wireless communication by high-frequency radio wave using frequency hopping, and an in-vehicle device used in a vehicle and configured to locate the portable terminal based on a reception strength of the high-frequency radio wave which is transmitted from the portable terminal and received by an antenna provided in the vehicle. The portable terminal includes a transmission unit configured to change, in an order by the frequency hopping, a channel for transmitting the high-frequency radio wave among a plurality of channels within a frequency band used for the short-range wireless communication, and transmit the high-frequency radio wave for each of the plurality of channels. A plurality of reception strengths of the high-frequency radio waves received by the antenna are sequentially measured for the plurality of channels in the order. The in-vehicle device includes a reception strength selection unit configured to select a particular number of reception strengths for consecutive ones of the plurality of channels from the plurality of reception strengths, and a terminal locator unit configured to locate the portable terminal based on the reception strength. The terminal locator unit is configured to prioritize the reception strength having a largest value in the particular number of reception strengths to locate the portable terminal. An upper limit of the particular number is set to be higher as an interval for transmitting information from the antenna to the in-vehicle device is shorter, and a lower limit of the particular number is set based on a multipath reduction effect.

According to a second aspect, an in-vehicle device is used in a vehicle and configured to locate a portable terminal based on a reception strength of a high-frequency radio wave transmitted from the portable terminal and received by an antenna provided in the vehicle. The portable terminal is configured to perform short-range wireless communication by the high-frequency radio wave using frequency hopping in which a channel for transmitting the high-frequency radio wave is sequentially changed in an order among a plurality of channels within a frequency band used for the short-range wireless communication. The plurality of reception strengths of the high-frequency radio waves received by the antenna is sequentially measured for the plurality of channels in the order. The in-vehicle device includes a reception strength selection unit configured to select a particular number of reception strengths for consecutive ones of the plurality of channels from the plurality of reception strengths, and a terminal locator unit configured to locate the portable terminal based on the reception strength. The terminal locator unit is configured to prioritize the reception strength having a largest value in the predetermine number of the reception strengths selected by the reception strength selection unit to locate the portable terminal. An upper limit of the particular number is set to be higher as an interval for transmitting information from the antenna to the in-vehicle device is shorter, and a lower limit of the particular number is set based on a multipath reduction effect.

According to a third aspect, a method is used in a vehicle for locating a portable terminal by an in-vehicle device used in the vehicle based on a reception strength of a high-frequency radio wave transmitted from the portable terminal and received by an antenna provided in the vehicle. The portable terminal is configured to perform short-range wireless communication by the high-frequency radio wave. The method includes: changing, in an order by the frequency hopping, a channel for transmitting the high-frequency radio wave among a plurality of channels within a frequency band used for the short-range wireless communication; transmitting the high-frequency radio wave for each of the plurality of channels; selecting, by the in-vehicle device, a particular number of reception strengths for consecutive ones of the plurality of channels from a plurality of reception strengths of the high-frequency radio waves received by the antenna, the plurality of reception strengths being sequentially measured for the plurality of channels in the order; and locating the portable terminal based on the reception strength by prioritizing the reception strength having a largest value in the particular number of reception strengths. An upper limit of the particular number is set to be higher as an interval for transmitting information from the antenna to the in-vehicle device is shorter, and a lower limit of the particular number is set based on a multipath reduction effect.

EMBODIMENTS

Figure 1:
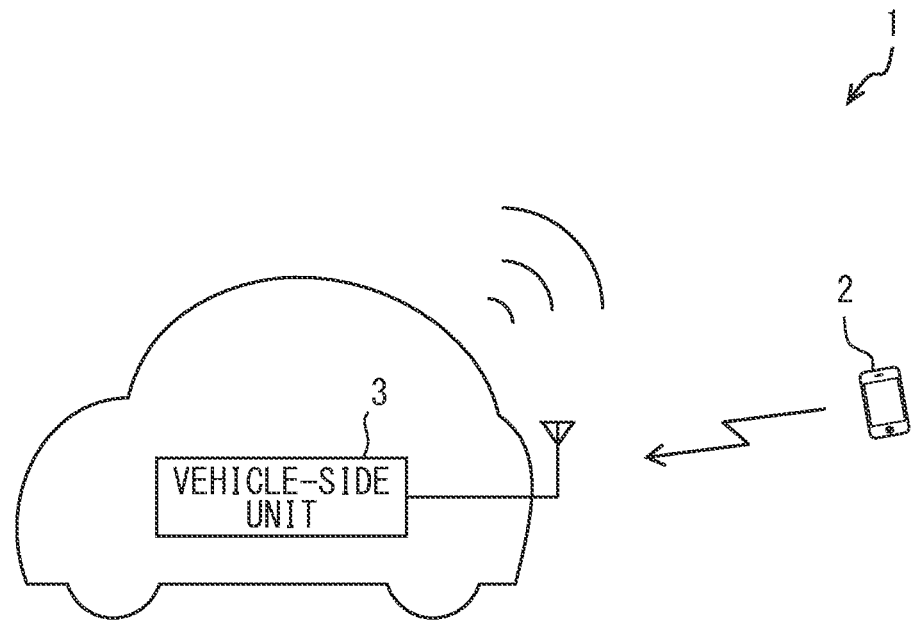
FIG. 1 is a diagram showing an example of a schematic configuration of a vehicle authentication system 1.

Since parts of the vehicle shield or reflect radio waves, the radio waves through the multiple paths due to the multipath weaken each other when the radio waves transmitted from the portable terminal to the antenna provided in the vehicle. Accordingly, the reception strength may significantly decrease in some regions in the vehicle. Since there are the regions where the accuracy of the reception strength may significantly decrease, the accuracy of locating the portable terminal based on the reception strength may also significantly decrease. Since the high-frequency radio waves such as the radio wave within 2.4 GHz band used for the Bluetooth standard conforming communication such as Bluetooth Low Energy have stronger straightness than the low-frequency band below 300 kHz, the accuracy may likely to decrease.

Such problem may occur even when the average value of the recent N reception strengths on the channel set for reception is used as the representative value, or the latest reception strength is used as the representative value.

Multiple embodiments will be described with reference to the drawings. For convenience of description, the same reference symbols are assigned to portions having the same functions as those illustrated in the drawings used in the description so far among the plurality of embodiments, and a description of the same portions may be omitted. Description in another applicable embodiment may be referred to for such a portion denoted by the identical reference symbols.

First Embodiment

<Schematic Configuration of Vehicle Authentication System 1>

Hereinafter, a present embodiment will be described with reference to the drawings. First, a vehicle authentication system 1 will be described with reference to FIG. 1. As shown in FIG. 1, the vehicle authentication system 1 includes a portable terminal 2 and a vehicle-side unit 3.

The portable terminal 2 is, for example, an information processing terminal such as a tablet terminal and a multi-functional mobile phone including a smartphone. The portable terminal 2 is carried by a user. In addition, the phrase "carried by a user" means that the user can carry to use the portable terminal 2. That is, the phrase "carried by a user" does not limitedly indicate a state of being carried by the user but also includes a state of not being carried by the user. In the following description, a case where the portable terminal 2 is a smartphone will be described.

In the vehicle authentication system 1, a smartphone key system can be utilized. In the smartphone key system, a code verification is performed between the portable terminal 2 and the vehicle-side unit 3 via the short-distance wireless communication, and the locking and unlocking of the vehicle doors are allowed when the authentication by the code verification is established. In the vehicle authentication system 1, the portable terminal 2 functions as an electronic key of the vehicle.

<Schematic Configuration of Portable Terminal 2>

Figure 2:
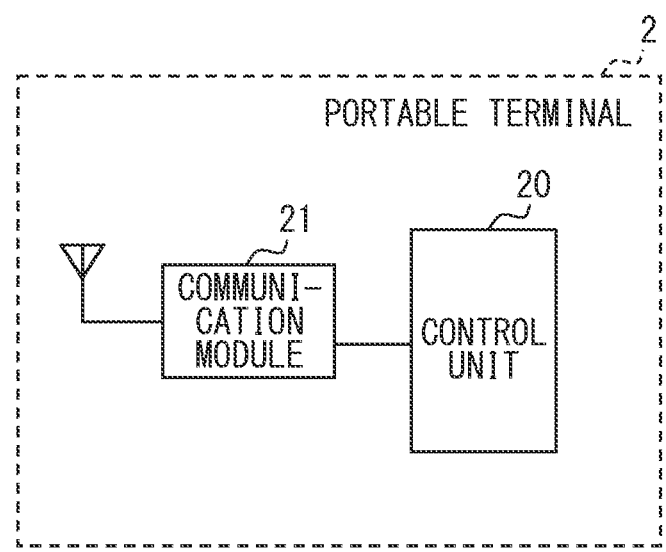
FIG. 2 is a diagram showing an example of a schematic configuration of a portable terminal 2.

The following will describe a configuration of the portable terminal 2 with reference to FIG. 2. As shown in FIG. 2, the portable terminal 2 includes a control unit 20 and a communication module 21. In the present embodiment, the description for configurations of the portable terminal 2 other than configurations related to the smartphone key system is omitted.

The communication module 21 is configured to perform short-range wireless communication with the vehicle-side unit 3. The short-range wireless communication is, for example, the communication conforming to a predetermined short-range wireless communication standard whose communication range is limited to about several tens of meters at the maximum. As the short-range wireless communication standard, Bluetooth Low Energy (hereinafter referred to as BLE), Wi-Fi (registered trademark), ZigBee (registered trademark) and the like can be adopted. For the short-range wireless communication, high-frequency radio waves such as radio waves in the 2.4 GHz band are used. For example, the high-frequency radio waves may be radio waves of 1 GHz or more and less than 10 GHz. In the present embodiment, a case where a BLE-compliant communication is performed within the 2.4 GHz band is described as an example. The 2.4 GHz band includes radio waves from 2400 MHz to 2500 MHz.

The communication module 21 is configured to receive, by scanning, advertising packets which are periodically transmitted from the vehicle-side unit 3, and establish a connection (communication connection) with the vehicle-side unit 3. The communication module 21 is configured to transmit and receive information via the connection that is a virtual dedicated communication path. The communication module 21 corresponds to a transmission unit.

In the Bluetooth standard such as BLE, encrypted data communication is performed by a frequency hopping method. The frequency hopping method is a communication method in which channels to be used for a communication are successively switched to another over time. Specifically, in the Bluetooth standard, the data communication is performed by a frequency hopping spread spectrum method (FHSS: Frequency Hopping Spread Spectrum). That is, in the present embodiment, the portable terminal 2 is configured to perform the short-distance wireless communication using the frequency hopping. The communication module 21 is configured to change channels for transmitting the high-frequency radio waves within the frequency band used for the short-distance wireless communication, and transmit high-frequency radio waves for each channel. In the present embodiment, the frequency band used for the short-distance wireless communication is the 2.4 GHz band.

In BLE, 40 channels from the number 0 to the number 39 are prepared. Three channels from the number 37 to the number 39 are the channels used for transmitting the advertising packets. Thirty seven channels from the number 0 to the number 36 are used for the data communication. The communication module 21 is configured to perform the data communication while sequentially changing the thirty seven channels from the number 0 to the number 36 by the frequency hopping.

It is preferable that the channel used by the communication module 21 is switched randomly. For example, the used channel can be randomly changed using the Hopincrement as a parameter indicating a transition rule for the used channel. The Hopincrement is determined randomly when the connection is established. Hereinafter, an example will be described, where the communication module 21 changes the used channel randomly by the frequency hopping.

The control unit 20 includes a processor and a memory, for example, and is configured to perform process related to the smartphone key system. When the connection between the communication module 21 and the vehicle-side unit 3 is established, the control unit 20 outputs a code for the code verification to the communication module 21, and the vehicle-side unit 3 transmits the code on the high-frequency radio waves. For example, when the vehicle-side unit 3 is configured to transmit random number codes, the control unit 20 encrypts the acquired random number code by the private key and the encryption algorithm used in the common key encryption method to generate the encrypted code. The control unit 20 is configured to output the encrypted code as the code for the code verification to the communication module 21. The code for code verification may be a code distributed from the center or the like as a legitimate key information of the vehicle.

<Schematic Configuration of Vehicle-Side Unit 3>

Figure 3:
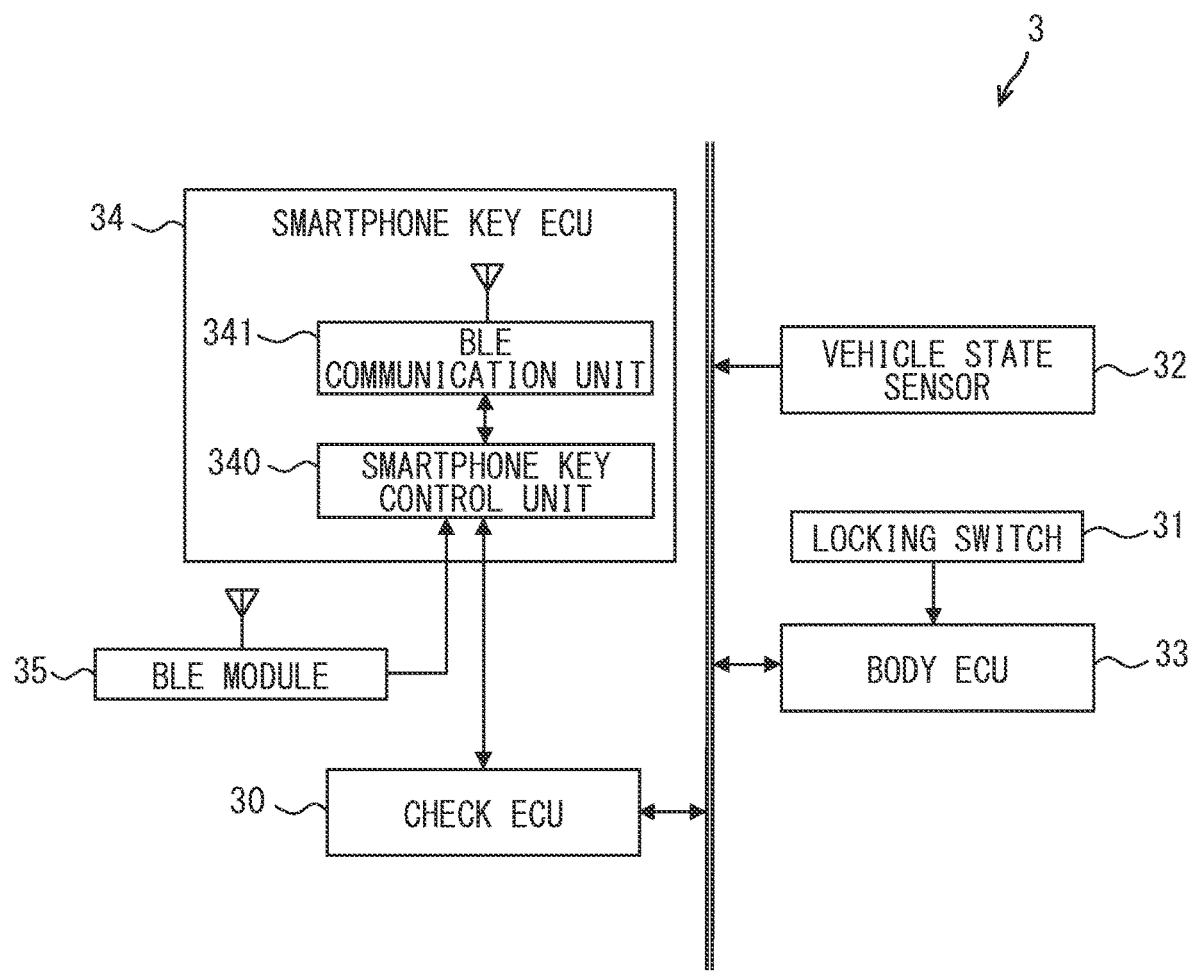
FIG. 3 is a diagram showing an example of a schematic configuration of a vehicle-side unit 3.

The following will describe an example of a schematic configuration of the vehicle-side unit 3 with reference to FIG. 3. As shown in FIG. 3, the vehicle-side unit 3 includes the check ECU 30, a locking switch 31 (hereinafter, referred to as locking SW), a vehicle state sensor 32, a body ECU 33, a smartphone key ECU 34, and a BLE module 35. For example, the check ECU 30, the vehicle state sensor 32, and the body ECU 33 are connected with the in-vehicle LAN.

The locking switch 31 is a switch for requesting lock or unlock of vehicle doors such as a driver seat door, a passenger seat door, and a trunk room door. The locking switch 31 may be provided on an outer door handle of the vehicle or on a rear bumper. As the locking switch 31, for example, a touch switch or a mechanical button switch can be used. A signal from the locking switch 31 may be output to, for example, the body ECU 33.

The vehicle state sensor 32 is a sensor group configured to detect information related to a vehicle behavior such as a vehicle traveling state and an operation state of the vehicle. The vehicle state sensor 32 may include a sensor such as a vehicle speed sensor configured to detect a vehicle speed, a shift position sensor configured to detect a transmission shift position, and the like.

The body ECU 33 is an electronic control device including a processor, a memory, and the like, for example. The body ECU 33 is configured to lock and unlock each vehicle door by transmitting a drive signal for controlling locking and unlocking of each vehicle door to a door lock motor provided in each vehicle door. Further, the body ECU 33 is connected to the locking switch 31, and receives a signal corresponding to on or off of the locking switch 31.

The smartphone key ECU 34 is an electronic control device including a processor, a memory, and the like, for example. The smartphone key ECU 34 includes, as shown in FIG. 3, a smartphone key control unit 340 and a BLE communication unit 341. The smartphone key ECU 34 is configured to perform process related to the smartphone key system. The smartphone key ECU 34 is connected with the check ECU 30 and the BLE module 35.

The BLE communication unit 341 is a communication module including, for example, an IC, an antenna, a communication circuit, and the like. The BLE communication unit 341 performs a BLE-compliant wireless communication according to an instruction from the smartphone key control unit 340. The smartphone key control unit 340 includes a processor, a memory, and the like, and controls the communication of the BLE communication unit 341.

The smartphone key control unit 340 is configured to, in response to the instruction from the check ECU 30, perform the polling by periodically transmitting the advertising packet by the BLE communication unit 341 at the time of parking of the vehicle. The smartphone key control unit 340 does not perform the polling without the instruction from the check ECU 30. When the communication module 21 of the portable terminal 2 receives the advertising packet, the connection between the communication module 21 and the BLE communication unit 341 is established. After the connection is established, the smartphone key control unit 340 causes the BLE communication unit 341 to transmit the code for the code verification to the portable terminal 2. Hereinafter, an example where the random number code is used for the code verification will be described.

When the portable terminal 2 received the random number code, the portable terminal 2 transmits the encrypted code by the high-frequency radio waves. The portable terminal 2 randomly changes, by the frequency hopping, the channel for transmitting the high-frequency radio waves to transmit the encrypted code. The smartphone key control unit 340 acquires the encrypted code transmitted from the communication module 21 through the BLE communication unit 341, and outputs it to the check ECU 30.

The BLE module 35 is a communication module capable of performing a BLE-compliant wireless communication. Similar to the BLE communication unit 341, the BLE module 35 may have, for example, a configuration including an IC, an antenna, a communication circuit, and the like. This BLE module 35 has at least an element corresponding to an antenna. Further, the BLE module 35 has, for example, a configuration including an RSSI measurement circuit for measuring a reception signal strength indicator (hereinafter, RSSI) of a received radio wave. This RSSI corresponds to the reception strength. The BLE module 35 receives and measures the RSSI of the radio wave by sniffing (that is, intercepting) the radio wave used for connection type communication that is performed during establishing the communication connection between the communication module 21 of the mobile terminal 2 and the BLE communication unit 34. That is, the BLE module 35 measures the RSSI of the radio wave transmitted from the portable terminal 2 without establishing the connection with the portable terminal 2.

The BLE module 35 is configured to receive the high-frequency radio waves transmitted for each of the channels switched by the frequency hopping. The BLE module 35 is configured to measure the RSSI of each of the high-frequency radio waves of each channel. The BLE module 35 is configured to sequentially receive the high-frequency radio waves transmitted through each of the randomly switched channels using the parameter indicating the transition rule (hopping sequence) of the used channel of the frequency hopping. The BLE module 35 outputs the measured RSSI to the check ECU 30.

The BLE communication unit 341 may also include the RSSI measurement circuit to measure the RSSI of the radio wave received by the BLE communication unit 341. In this case, the BLE communication unit 341 is configured to measure the RSSI of the high-frequency radio waves of each channel transmitted from the portable terminal 2, and output the measured RSSI to the check ECU 30.

It is preferable that multiple BLE modules 35 are provided in the vehicle, and measure the RSSI of the radio wave transmitted from the mobile terminal 2 at each location of the BLE modules 35. For example, the BLE modules 35 are at least arranged on, for example, an outer surface of the vehicle door, a roof of the vehicle, a bonnet, a pillar, or the like so that a predetermined region outside of the vehicle becomes a strong electric field area.

Figure 4:
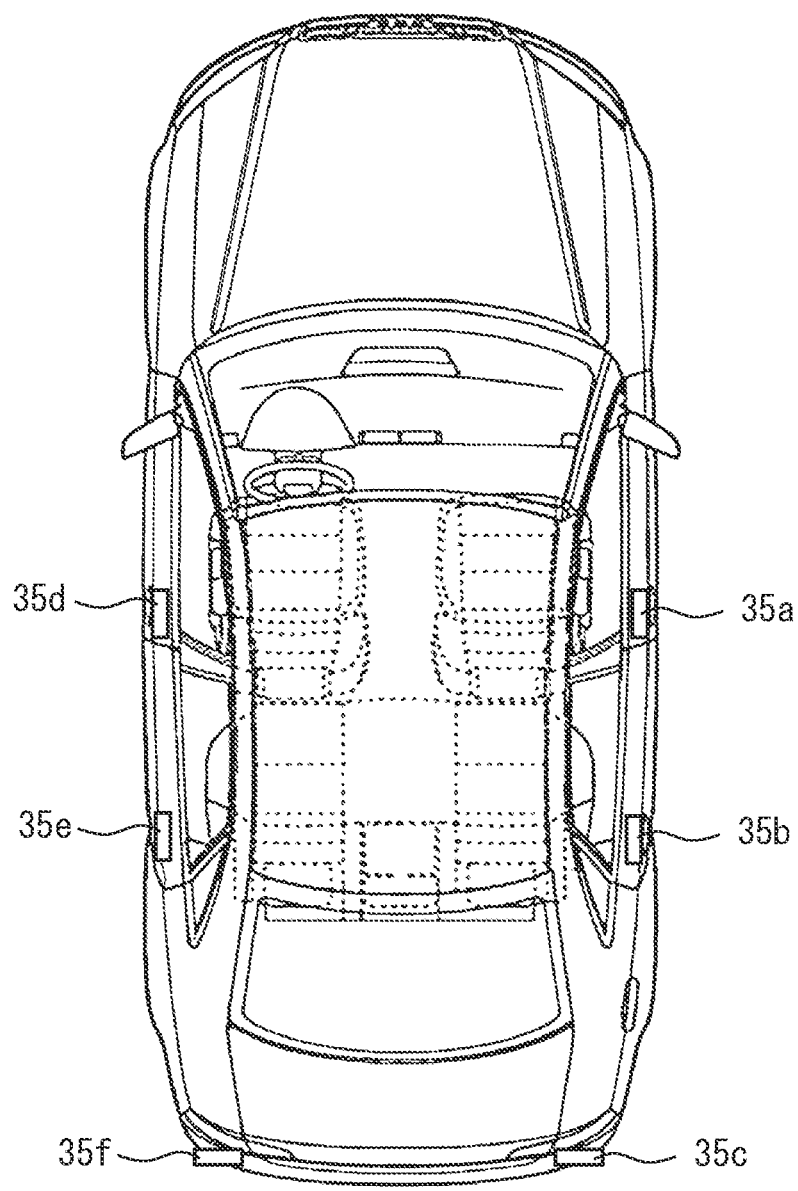
FIG. 4 is a diagram showing an example of an arrangement of BLE modules 35 (35*a*-35*f*).

For example, as shown in FIG. 4, the BLE modules 35a-35f are arranged in parts of the lateral surface of the vehicle. The BLE module 35a is located on an outer surface of a right door of a front seat of the vehicle. The BLE module 35b is located on an outer surface of a right door of a rear seat of the vehicle. The BLE module 35c is arranged near a right corner of a rear end of the vehicle. The BLE module 35d is located on an outer surface of a left door of a front seat of the vehicle. The BLE module 35e is arranged on an outer surface of a left door of a rear seat of the vehicle. The BLE module 35f is arranged near a left corner of a rear end of the vehicle.

The BLE module 35 outputs the measured RSSI to the smartphone key control unit 340. Since the RSSI has a distance attenuation characteristic, it is possible to calculate a distance between the BLE module 35 and the portable terminal 2 from the RSSI measured by the BLE module 35. Further, the position of the portable terminal 2 with respect to the vehicle can be determined from the distance between the BLE module 35 and the portable terminal 2.

For example, the position of the portable terminal 2 with reference to a reference point in the vehicle can be discovered using the principle of triangulation based on the distances calculated from the RSSI measured by three or more BLE modules 35 and the positions of the BLE modules 35 in the vehicle. It can be determined whether the portable terminal 2 is located on the outside of the vehicle using the value of the RSSI measured by one BLE module 35. In this case, it is sufficient to determine whether the portable terminal 2 is located outside of the vehicle based on whether the RSSI value is at or above a threshold value for distinguishing that the portable terminal 2 is located outside the vehicle.

The check ECU 30 includes a processor, a memory, an I/O, and a bus that connects those devices, and executes various processes related to the authentication in the vehicle by executing a control program stored in the memory. The check ECU 30 is configured to execute a process (hereinafter, referred to as a locating related process) related to locating the portable terminal 2 by executing control program stored in the memory. The memory referred to here is a non-transitory tangible storage medium for storing programs and data that can be read by a computer non-transitory way. The non-transitory tangible storage medium is embodied by a semiconductor memory or a magnetic disk. The check ECU 30 corresponds to an in-vehicle device. The configuration including the check ECU 30 corresponding to the in-vehicle device and the portable terminal 2 corresponds to a vehicle system. The details of the check ECU 30 will be described below.

<Schematic Configuration of Check ECU 30>

Figure 5:
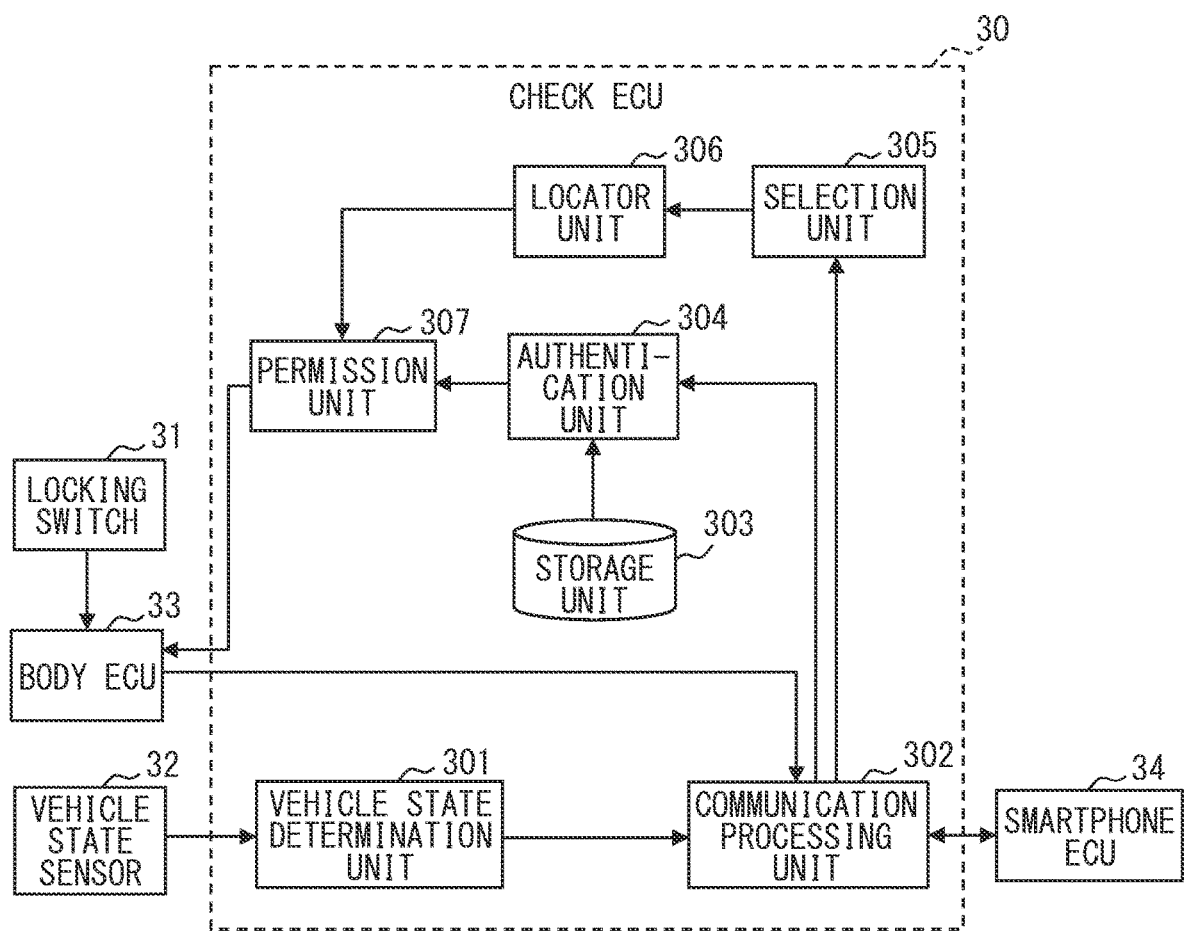
FIG. 5 is a diagram showing an example of a schematic configuration of a check ECU 30.

The following will describe an example of a schematic configuration of the check ECU 30 with reference to FIG. 5. As shown in FIG. 5, the check ECU 30 includes, as functional blocks, a vehicle state determination unit 301, a communication processing unit 302, a storage unit 303, an authenticator unit 304, a selection unit 305, a locator unit 306, and a permission unit 307.

The vehicle state determination unit 301 is configured to determine the state of the vehicle based on the sensing results related to the vehicle state detected by the vehicle state sensor 32. For example, the vehicle state determination unit 301 determines whether the vehicle is in a parked state based on a vehicle speed detected by a vehicle speed sensor, a shift position detected by a shift position sensor, and the like.

The communication processing unit 302 is configured to, together with the smartphone key ECU 34, communicate with the portable terminal 2. The communication processing unit 302 is configured to request the smartphone key ECU 34 to transmit the advertising packet based on the signal input from the body ECU 33 and the vehicle state determined by the vehicle state determination unit 301.

For example, the communication processing unit 302 requests the smartphone key ECU 34 to periodically transmit the advertising packet after a certain period of time is elapsed from the timing when the vehicle is parked and all the doors of the vehicle are locked. The smartphone key ECU 34 is configured to perform the polling to transmit the advertising packet from the BLE communication unit 341 in response to the request. The communication processing unit 302 is configured to acquire, through the smartphone key ECU 34, the encrypted code transmitted from the portable terminal 2 which has received the advertising packet.

The communication processing unit 302 is configured to acquire, through the smartphone key ECU 34, the RSSI of the high-frequency radio waves of each channels used for transmitting the encrypted code and measured by the BLE module 35. When multiple BLE modules 35 are provided in the vehicle, the communication processing unit 302 acquires the RSSI of the high-frequency radio waves of each channel from each BLE module 35.

The storage unit 303 stores information for authentication. The information related to authentication may include a private key used in the common key cryptography method. The storage unit 303 is, for example, an electrically rewritable non-volatile memory.

The authenticator unit 304 is configured to authenticate using the code verification. The authenticator unit 304 is configured to compare, as the code verification, the encrypted code acquired by the communication processing unit 302 with the encrypted code acquired by encrypting the random number code transmitted from the BLE communication unit 341 by the private key stored in the storage unit 303. The result of the code verification is output to the permission unit 307.

The selection unit 305 is configured to select multiple RSSI each of which is received by the same BLE module 35 and is measured for the high-frequency radio waves of each channel. This selection unit 305 corresponds to the reception strength selection unit. In the present embodiment, the selection unit 305 is configured to select the RSSI which are received by the same BLE module 35 and measured for each high-frequency radio wave of the particular number channels which are changed in consecutive order in the frequency hopping.

The particular number is determined such that both the response time and the multipath reduction effect can be achieved. The response time is, for example, the time from the establishment of the connection with the portable terminal 2 to the discovery of the position of the portable terminal 2. The multipath reduction effect makes it possible to locate the portable terminal with less influence of multipath. The response time becomes longer as the particular number increases. Accordingly, the upper limit of the particular number may be determined such that the response time does not become too long. The response time is shorter as the communication interval for transmitting information from the BLE module 35 to the smartphone key ECU 34 is shorter. Accordingly, the upper limit of the particular number may be higher when the communication interval is shorter. When the particular number is smaller, the possibility of selecting the RSSI that are less likely to be weakened by the influence of the multipath decreases. Accordingly, the lower limit of the particular number may be determined based on the multipath reduction effect such that the multipath reduction effect is not too low. For example, the particular number is five in the following description.

When multiple BLE modules 35 are provided in the vehicle, the selection unit 305 is configured to select, for each BLE module 35, the RSSI which are received by the same BLE module 35 and measured for each high-frequency radio wave of the particular number channels which are changed in consecutive order in the frequency hopping. In the case shown in FIG. 4, the selection unit 305 selects, for each of the BLE modules 35a-35f, the RSSI of the five channels which are changed in consecutive order in the frequency hopping.

The locator unit 306 is configured to locate the portable terminal 2 based on the RSSI having the largest value (hereinafter, referred to as the largest RSSI) among the RSSI of the five channels selected by the selection unit 305. The locator unit 306 corresponds to a terminal locator unit. The RSSI of the five channels selected by the selection unit 305 are the RSSI of the high-frequency radio waves transmitted from the portable terminal 2, which is estimated to exist at the same position, and received by the same BLE module 35. Accordingly, the largest RSSI can be an RSSI to which the influence of the multipath is the smallest among the RSSI of the five channels selected by the selection unit 305. Accordingly, the portable terminal 2 can be located accurately by locating the portable terminal 2 based on the largest RSSI.

The locator unit 306 is configured to locate the portable terminal 2 relative to the vehicle based on the strength of the largest RSSI and the distance attenuation characteristics of the RSSI. For example, in the present embodiment, the locator unit 306 determines the largest RSSI among the five channels selected by the selection unit 305 for each BLE modules 35a-35f. The locator unit 306 locates the portable terminal 2 by the principle of triangulation, as described above, using the largest RSSI of three of the BLE modules 35a-35f. The locator unit 306 may determine whether the portable terminal 2 is located outside of the vehicle based on the position of the portable terminal 2.

The locator unit 306 may be configured to locate the portable terminal 2 relative to the reference point in the vehicle by the principle of triangulation using largest three RSSI in the largest RSSI measured by each of four or more BLE module 35 (antenna). The RSSI having a larger value in the largest RSSI determined by each of four or more BLE module 35 is likely to be an RSSI to which the influence of the multipath is suppressed. Accordingly, the portable terminal 2 can be located more accurately.

When the verification by the authenticator unit 304 is successful and the locator unit 306 determines that the portable terminal 2 is located outside of the vehicle, the permission unit 307 transmits the signal to the body ECU 33 for allowing to unlock the doors of the vehicle. As a result, unlocking of each door is permitted. In contrast, when the locator unit 306 determines that the portable terminal 2 is not located outside of the vehicle, the permission unit 307 does not transmit the signal to the body ECU 33 for allowing to unlock the doors of the vehicle even if the verification by the authenticator unit 304 is successful. In this case, unlocking of each door is not permitted. The permission unit 307 does not transmit the signal for permitting the unlocking of each door of the vehicle when the verification failed.

<Locating Related Process by Check ECU 30>

Next, an example of the flow of locating related process by the check ECU 30 will be described with reference to the flowchart of FIG. 6. The process shown in FIG. 6 may be started after a certain period of time has elapsed after all the doors are locked when the vehicle is parked. Execution of the steps included in the series of steps related to the locating related process by the computers of the portable terminal 2 and the vehicle-side unit 3 corresponds to the execution of the terminal locating method.

In step S1, the communication processing unit 302 requests the smartphone key ECU 34 to periodically transmit the advertising packet. Accordingly, the smartphone key ECU 34 starts the polling to transmit the advertising packet from the BLE communication unit 341. When the portable terminal 2 is located in an area where the portable terminal 2 can receive the advertising packet, the portable terminal 2 receives the advertising packet, and accordingly the connection between the BLE communication unit 341 of the smartphone key ECU 34 and the portable terminal 2 is established. When the connection is established, the random number code is transmitted from the BLE communication unit 341 to the portable terminal 2, and the encrypted code is transmitted from the portable terminal 2.

In step S2, when the communication processing unit 302 received the encrypted code transmitted from the portable terminal 2 through the smartphone key ECU 34 (S2: YES), the process proceeds to step S3. In contrast, when the communication processing unit 302 has not received the encrypted code (S2: NO), step S2 is repeated. As described above, the portable terminal 2 randomly changes, by the frequency hopping, the channel for transmitting the high-frequency radio waves to transmit the encrypted code.

In step S3, the communication processing unit 302 acquires the RSSI by measuring (sniffing) the high-frequency radio waves of each of the channels switched by the frequency hopping. In step S4, the selection unit 305 selects the RSSI which are received by the same BLE module 35 and measured for each high-frequency radio wave of the particular number channels which are changed in consecutive order in the frequency hopping. In the present embodiment, the selection unit 305 selects the RSSI of five channels for each of the BLE modules 35a-35f.

In step S5, the locator unit 306 determines the largest RSSI having the largest value in the RSSI for each of the particular number channels selected in step S4. In the present embodiment, the selection unit 305 selects the largest RSSI from the RSSI of five channels for each of the BLE modules 35a-35f.

In step S6, the locator unit 306 locates the portable terminal 2 based on the largest RSSI determined in step S5. In the present embodiment, the locator unit 306 locates the portable terminal 2 relative to a reference point in the vehicle by the principle of triangulation, as described above, using the RSSI of three of the BLE modules 35a-35f.

In the present embodiment, the position of the portable terminal 2 discovered by the locator unit 306 is used for the permission for the vehicle control. However, the usage of the position is not limited to this example. For example, the position of the portable terminal 2 discovered by the locator unit 306 may be used by another application configured to output warning when the portable terminal 2 is left behind in the passenger compartment after the occupant stepped out of the vehicle.

Overview of the First Embodiment

The influence of the multipath varies depending on the frequency even when the high-frequency radio waves are transmitted from the same position, and the RSSI may less likely to be reduced. In view of this point, in the first embodiment, the portable terminal 2 is located based on the RSSI having the largest value in multiple RSSI of the high-frequency radio waves measured for each channel changed within the frequency band used for the short-distance wireless communication. The RSSI having the largest value in the RSSI of the high-frequency radio waves received by the same BLE module 35 is an RSSI to which the influence of the multipath is suppressed. Therefore, according to the first embodiment, the portable terminal 2 can be located while suppressing the influence of the multipath. As a result, even when the portable terminal 2 is located using the RSSI (reception strength) of the high-frequency radio waves transmitted from the portable terminal 2, the portable terminal 2 can be located accurately.

According to the first embodiment, since the frequency hopping used in the Bluetooth standard is used, additional configurations for randomly changing the channel for transmitting the high-frequency radio waves are not needed.

According to the first embodiment, the selection unit 305 is configured to select the RSSI which are received by the same BLE module 35 and measured for each high-frequency radio wave of the particular number channels which are changed in consecutive order in the frequency hopping, and determine the largest RSSI. Since the RSSI of the high-frequency radio waves of the particular number of channels which are changed in consecutive order are selected, the response time can be shortened compared with a case where the RSSI of the high-frequency radio waves of the channels which are not changed in consecutive order are selected. Since the channel is randomly changed in the frequency hopping, similar frequency channels may not be selected even though the RSSI measured for the particular number of the channels changed in consecutive order in the frequency hopping are selected. Accordingly, the RSSI that is unlikely to be weakened by the multipath is likely to be selected.

Further, according to the first embodiment, the upper limit and the lower limit of the particular number are determined such that the response time is not too long and the multipath reduction effect is higher. That is, both the shorter response time and the higher multipath reduction effect can be obtained. The following will describe technical effects of the configuration described in the first embodiment with reference to FIG. 7.

Figures 6, 7:
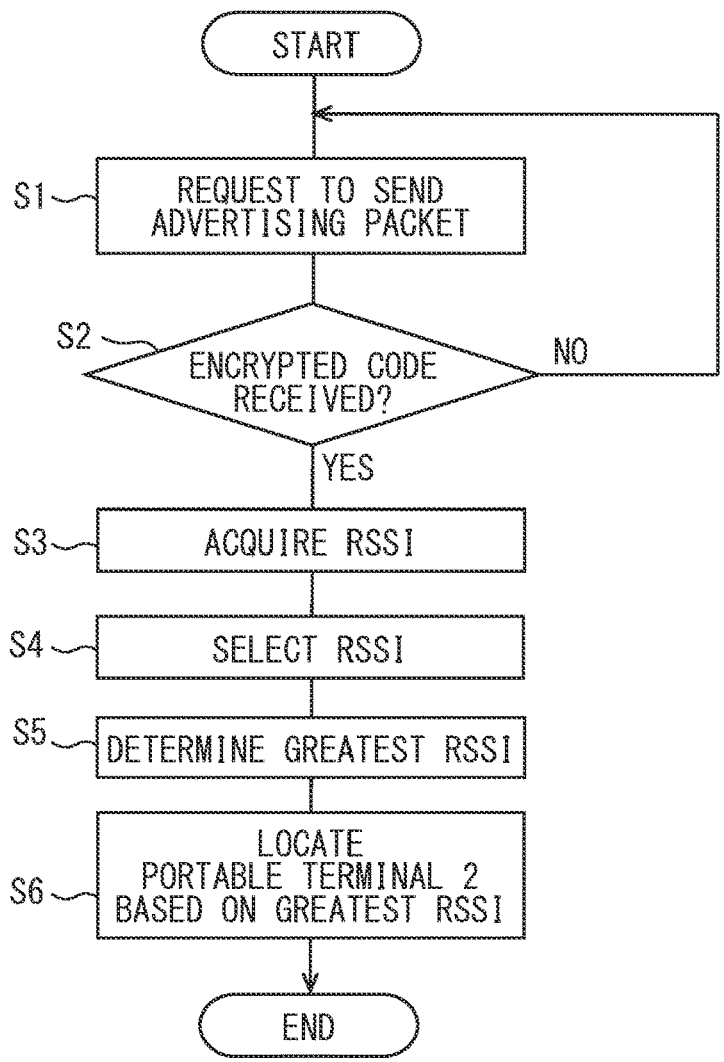
FIG. 6 is a flowchart showing an example of a flow of locating related process executed by the check ECU 30.
FIG. 7 is a diagram showing a technical effect provided by a configuration described in the first embodiment.

FIG. 7 shows the results of the experiment about the change in the number of the regions (null points), where the RSSI significantly decreases, due to the change of the particular number for one BLE module 35. FIG. 7 shows a case where the largest value of the RSSI in the high-frequency radio waves of the particular number of channels is used, and a case where an average value of the predetermined RSSI is used. The average value referred to here is an arithmetic mean value. In addition, for convenience, the particular numbers are shown as "small", "intermediate", and "large".

As shown in FIG. 7, when the average is used, the number of the null point is not improved regardless of the particular number. In contrast, when the largest value is used, the number of the null point is improved in the intermediate or large particular numbers. However, there is no significant difference in the improvement of the number of the null point between the intermediate and large particular numbers. Accordingly, in the examples shown in FIG. 7, when the particular number is intermediate, the response time and the multipath reduction effect can be most compatible. Both the response time and the multipath reduction effect can be achieved by setting the upper limit and the lower limit of the particular number.

Second Embodiment

In the first embodiment, the particular number of RSSI are selected by the selection unit 305 from the RSSI acquired by the communication processing unit 302. However, the configuration is not limited to this. For example, the communication processing unit 302 may have the same function as the selection unit 305, and the BLE module 35 may be configured to acquire only the particular number RSSI.

Third Embodiment

In the first embodiment, the position of the portable terminal 2 is discovered based on the largest RSSI among the particular number RSSI selected by the selection unit 305. However, the configuration is not limited to this. As long as the largest RSSI among the particular number RSSI selected by the selection unit 305 is prioritized to locate the portable terminal 2 based on the RSSI, another configuration may be used.

For example, the weighting of the largest RSSI is increased to locate the portable terminal 2 based on the RSSI. Specifically, the portable terminal 2 may be located based on the weighted average of the particular number RSSI selected by the selection unit 305 in which the weighting of the largest RSSI is increased. Further, the portable terminal 2 may be located based on the arithmetic mean value of the RSSI. These RSSI include the largest RSSI and have larger values in the particular number of the RSSI selected by the selection unit 305. Further, the number of these RSSI is less than the particular number.

Even when the portable terminal 2 is located based on the RSSI by weighting the largest RSSI, since the weighting of the largest RSSI is increased, the portable terminal 2 can be located with less influence of the multipath.

Fourth Embodiment

In the first embodiment, a configuration is shown in which the position of the mobile terminal 2 with respect to the reference point of the vehicle is determined by the principle of triangulation using the maximum RSSI for three of the plurality of BLE modules 35. However, the configuration is not limited to this. For example, the area where the portable terminal 2 is located may be narrowed down and determined based on whether or not the largest RSSI for at least one BLE module 35 is equal to or greater than the threshold value.

Fifth Embodiment

In the first embodiment, the short-range wireless communication conforming the Bluetooth standard such as the BLE is used as the short-range wireless communication using the high-frequency radio waves between the portable terminal 2 and the vehicle-side unit 3. For example, the short-distance wireless communication conforming the short-distance wireless communication standard other than the Bluetooth standard may be used. In this case, the channel for transmitting the high-frequency radio waves may be changed by a method other than the frequency hopping. For example, the channel for transmitting the high-frequency radio waves may be changed at regular frequency intervals instead of at random.

Sixth Embodiment

In the first embodiment, the check ECU 30 is configured to select the particular number RSSI and determine the largest RSSI. However, the configuration is not limited to this. For example, the smartphone key ECU 34 may be configured to select the predetermined RSSI and/or determine the largest RSSI. In this case, the selection unit 305 is included in the smartphone key ECU 34. Further, a unit including the check ECU 30 and the smartphone key ECU 34 corresponds to the in-vehicle device. Moreover, the locator unit 306 may be included in the smartphone key ECU 34. In this case, the position of the portable terminal 2 discovered by the smartphone key ECU 34 may be used for permission of the vehicle control. In this case, the smartphone key ECU 34 corresponds to the in-vehicle device.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The periphery monitoring device and the periphery monitoring method described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

What is claimed is:

1. A vehicle system comprising:
   a portable terminal configured to perform short-range wireless communication by high-frequency radio wave using frequency hopping; and
   an in-vehicle device used in a vehicle and configured to locate the portable terminal based on a reception strength of the high-frequency radio wave which is transmitted from the portable terminal and received by an antenna provided in the vehicle, wherein
   the portable terminal includes a transmission unit configured to
      change, in an order by the frequency hopping, a channel for transmitting the high-frequency radio wave among a plurality of channels within a frequency band used for the short-range wireless communication, and
      transmit the high-frequency radio wave for each of the plurality of channels,
   a plurality of reception strengths of the high-frequency radio waves received by the antenna are sequentially measured for the plurality of channels in the order,
   the in-vehicle device includes
      a reception strength selection unit configured to select a particular number of reception strengths for consecutive ones of the plurality of channels from the plurality of reception strengths, and
      a terminal locator unit configured to locate the portable terminal based on the reception strength, and
   the terminal locator unit is configured to prioritize the reception strength having a largest value in the particular number of reception strengths to locate the portable terminal, and
   an upper limit of the particular number is set to be higher as an interval for transmitting information from the antenna to the in-vehicle device is shorter, and
   a lower limit of the particular number is set based on a multipath reduction effect.

2. The vehicle system according to claim 1, wherein the terminal locator unit is configured to locate the portable terminal based on the reception strength having the largest value in the particular number of reception strengths selected by the reception strength selection unit.

3. The vehicle system according to claim 1, wherein the terminal locator unit is configured to weight the reception strength having the largest value in the particular number of reception strengths selected by the reception strength selection unit to locate the portable terminal based on the reception strength.

4. The vehicle system according to claim 1, wherein a plurality of the antennas are provided in the vehicle, the plurality of reception strengths of the high-frequency radio waves received by each of the plurality of antenna are measured for the each of the plurality of antenna, the reception strength selection unit is configured to select, for the each of the plurality of antennas, the particular number of reception strengths from the plurality of reception strengths of the high-frequency radio waves received by the each of the plurality of antennas, and
   the terminal locator unit is configured to prioritize the reception strengths each of which has the largest value in the particular number of the reception strengths selected for the each of the plurality of antennas by the reception strength selection unit to locate the portable terminal.

5. An in-vehicle device used in a vehicle and configured to locate a portable terminal based on a reception strength of a high-frequency radio wave transmitted from the portable terminal and received by an antenna provided in the vehicle, the portable terminal being configured to perform short-range wireless communication by the high-frequency radio wave using frequency hopping in which a channel for transmitting the high-frequency radio wave is sequentially changed in an order among a plurality of channels within a frequency band used for the short-range wireless communication, a plurality of reception strengths of the high-frequency radio waves received by the antenna being sequentially measured for the plurality of channels in the order, the in-vehicle device comprising:
   a reception strength selection unit configured to select a particular number of reception strengths for consecutive ones of the plurality of channels from the plurality of reception strengths; and
   a terminal locator unit configured to locate the portable terminal based on the reception strength, wherein
   the terminal locator unit is configured to prioritize the reception strength having a largest value in the predetermine number of the reception strengths selected by the reception strength selection unit to locate the portable terminal, and an upper limit of the particular number is set to be higher as an interval for transmitting information from the antenna to the in-vehicle device is shorter, and a lower limit of the particular number is set based on a multipath reduction effect.

6. A method used in a vehicle for locating a portable terminal by an in-vehicle device used in the vehicle based on a reception strength of a high-frequency radio wave transmitted from the portable terminal and received by an antenna provided in the vehicle, the portable terminal being configured to perform short-range wireless communication by the high-frequency radio wave, the method comprising:

changing, in an order by the frequency hopping, a channel for transmitting the high-frequency radio wave among a plurality of channels within a frequency band used for the short-range wireless communication;

transmitting the high-frequency radio wave for each of the plurality of channels;

selecting, by the in-vehicle device, a particular number of reception strengths for consecutive ones of the plurality of channels from a plurality of reception strengths of the high-frequency radio waves received by the antenna, the plurality of reception strengths being sequentially measured for the plurality of channels in the order; and locating the portable terminal based on the reception strength by prioritizing the reception strength having a largest value in the particular number of reception strengths, wherein an upper limit of the particular number is set to be higher as an interval for transmitting information from the antenna to the in-vehicle device is shorter, and a lower limit of the particular number is set based on a multipath reduction effect.

\* \* \* \* \*